Figure 1:
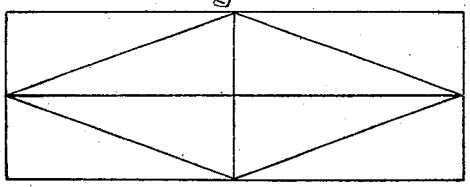

W. O. Reim.
Water Gauge.

No. 92,645 — Patented July 13, 1869.

Witnesses
Chas. A. Pettit
S. C. Kernon

Inventor
Wm. Oscar Reim
by Mary A. Reim
Attorney

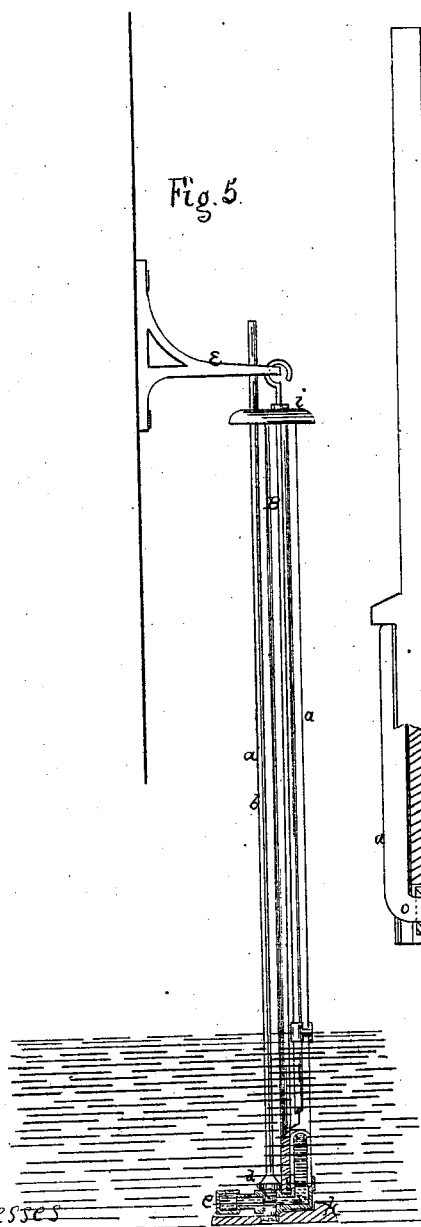
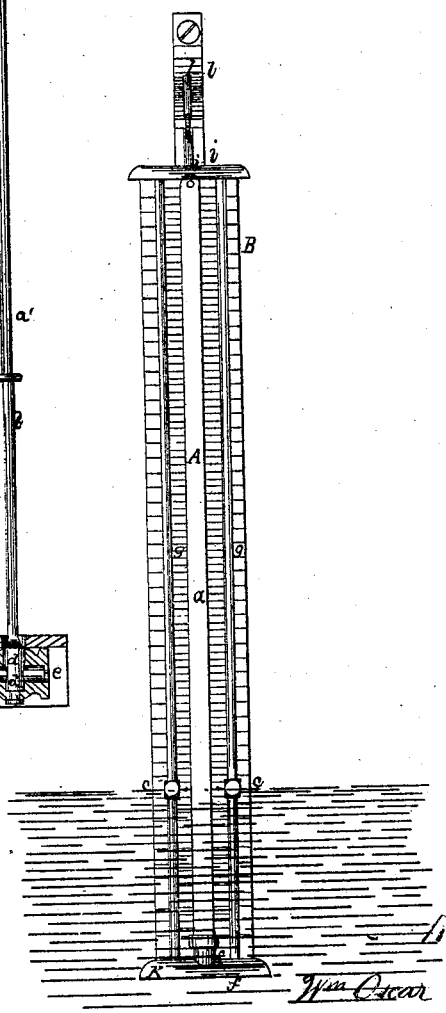

United States Patent Office.

WILLIAM OSCAR REIM, OF SPRINGFIELD, OHIO.

Letters Patent No. 92,645, dated July 13, 1869.

---

IMPROVEMENT IN SHIPS' CARGO-INDICATOR.

---

The Schedule referred to in these Letters Patent and making part of the same.

---

*To all whom it may concern:*

Be it known that I, WILLIAM OSCAR REIM, of Springfield, in the county of Clark, and State of Ohio, have invented a new and useful Mode of Weighing Vessels' Cargoes; and I do hereby declare that the following is a full, clear, and exact description of the construction and operation of the same, reference being had to the accompanying drawings, making a part of this specification.

This invention consists in a device for indicating the weight of a vessel's cargo by measuring the depth to which the vessel, when loaded, sinks into the water. It is a well-known law of physics that the volume of water displaced by any floating body is equal to its weight. The point at which a ship comes to rest is most accurately indicated by the water itself which surrounds her, and when the ship is empty is called the light-weight or zero point. As cargo is added, it gradually submerges the vessel, and when the cargo is all on board, the depth to which the vessel is sunk beyond the zero-point indicates the displacement caused by the cargo. If I ascertain by experiment that a certain weight placed on board my vessel sinks her a certain distance, thereafter I shall always know that when she sinks the same distance, she has on board the same weight. This is the fundamental principle of my invention, which I call the Champion Boat-Scale and Bilge-Water Indicator.

The successful operation of my invention demands—

First, that it shall be located on the outside of the vessel's hull.

Second, that the water shall operate on the indicator just as it operates on the outside of the hull.

Third, that the water shall be enclosed and confined within some vessel where it may be measured.

In the drawings, A is a glass tube open at both ends, half an inch or more in diameter, and of a length proportioned to the capacity of the vessel to which it is to be attached, that is to say, equal to the depth the vessel sinks when loaded.

The said tube is mounted in a wooden frame, B, and either graduated itself or provided with two plates, one at each side, and graduated from 0 up to the desired number of feet and inches.

The tube and scale are placed over the ship's side, the 0-point at the water-line when the ship is empty. When the cargo is all on board, the height of the water in the tube indicates the displacement effected by the cargo.

My tube is provided with a stop-cock, $a$, at its lower end, provided with a rod, $a^1$, running upward far enough to enable the operator to close the stop-cock from the deck.

When the water is at the proper height in the tube, the stop-cock $a$ is to be closed, and the frame B, with its tube and gauge, detached from the ship's side and brought on deck.

My gauge is provided with two indicators, $c$ $c$, fastened by means of set-screws, one of which indicators should be set to mark the height of the water in the tube. When this is done, the stop-cock is to be turned so as to let all the water out of the tube, and the instrument is then to be placed over the opposite side of the vessel, to measure the displacement there in the same way, which displacement is to be indicated by the other stop-cock. The average may then be struck between the two indicators.

Figure 2:
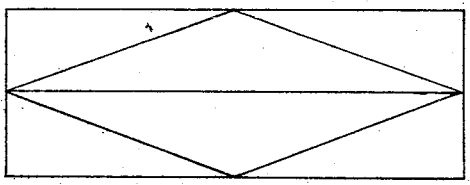
Figure 3:
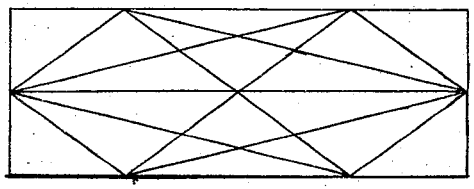
Figure 4:
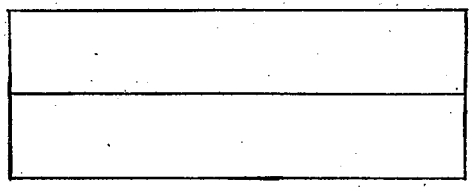

This process should take place amidships, (that is, the ship's transverse central line,) and at the bow and stern, and the average taken of the four measurements, which will give very nearly the true displacement of the cargo, as shown in figs. 1 and 2; or it may take place on both sides of the ship, at the central line between midships and the bow; and again at the central line between midships and the stern, as shown in fig. 3, and the average struck of these admeasurements.

The frame B has a longitudinal central channel made in it to receive the tube A, and protect it from injury. The channel is of a depth equal to half the external diameter of the tube, in order that if the latter lean in either direction from the perpendicular, the top of the column of water in the tube shall still be on the same level with the indicator, it being understood the latter is set even with the top of the column when the tube is perfectly vertical.

The means by which the instrument is rendered attachable and detachable, with respect to the vessel, is as follows:

A rod, $e$, projects straight out from the side of the vessel at a suitable point to hang the instrument from, which rod has an eye in its outer end, and in the top of the frame B is a hook which may be easily inserted in the eye or taken out of it.

The great advantage of providing my scale with a tube to receive, retain, and transport liquid, is that it may be used when the surface of the water in which the vessel is floating, is rough. It is obvious that if the surface were always quite plane it would be unnecessary to use detachable scales.

In fact, I contemplate attaching four or more graduated plates, $h$, to each vessel, said plates running straight down the sides.

In level water, as in canals, I design using both the plates $h$ and the tubes A, so that the former may serve as a check on the latter, and show, that if the tubes do not agree with the plates, the tubes must have been tampered with.

The zero-point is located both by the weight of the vessel and of the bilge-water she may contain. But as the amount of bilge-water varies at different times, the zero-point cannot always be a correct exponent of its quantity. It has therefore to be ascertained both before and after every loading of the vessel, in order to ascertain if the scale reports correctly. This is accomplished in the same manner as the outside measurements, and by the same means. The indicator rests upon the vessel's bottom, and receives the bilge-water into its tube. The points of measurement are the same as on the outside, that is, at bow, stern, and midships; or between bow and midships, and midships and stern.

Having thus described my invention,

What I claim as new, and desire to secure by Letters Patent, is—

A gauge so constructed, as, when placed on a ship's side, to admit water to indicate the displacement effected by the cargo, and to retain its water and continue a reliable indicator when removed from the ship's side and carried to any convenient place for observation, substantially as described.

WM. OSCAR REIM.

Witnesses:
JAS. L. TORBERT,
MAGGIE REIM.